Patented May 17, 1932

1,858,413

UNITED STATES PATENT OFFICE

ERICH NOACK, OF LEVERKUSEN-WIESDORF-ON-THE-RHINE, AND FRIEDRICH SCHUBERT, OF COLOGNE-DEUTZ-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CALCIUM BORIDE

No Drawing. Application filed May 16, 1931, Serial No. 537,988, and in Germany December 30, 1929.

The present invention relates to a new process for the manufacture of calcium boride.

Calcium boride, $CaB_6$, has been prepared up to date by reacting upon boric acid anhydride with calcium carbide at high temperatures (Geelmuyden, Comptes rendus 130. 1026, 1900). The calcium boride is obtained by this process in the form of a very hard reaction cake. Furthermore, the calcium carbide used as starting material is relatively expensive.

In accordance with the present invention calcium boride is obtained in a loose, pulverous reaction mass from much cheaper starting materials and in a very simple manner.

As starting materials containing calcium all calcium compounds dissociating at the reaction temperature come into consideration. Such compounds are, for example, calcium oxide, calcium hydroxide, calcium carbonate, calcium acetate, calcium formate, calcium borate; as boron containing compounds boric acid, boric acid anhydride and boric acid salts, as, for example, borax, tincal, calcium borate can be used. Best results will be obtained when using boric acid or boric acid anhydride. Carbon is added preferably in the form of coke powder or charcoal. The reaction temperature is bright white heat or, expressed in centigrades, above 1700° C., most likely 2000–2400° C. The starting materials are used in such quantities as follows: calcium compound about 40–80 parts by weight, boron compound about 50–500 parts by weight, carbon about 50–70 parts by weight; best results will be obtained when using 50 parts by weight of calcium carbonate, 100 parts by weight of boric acid anhydride and 60 parts by weight of coke, all starting materials being employed in the pulverized state.

When working in the manner described above a loose reaction mass, containing beautifully crystallized calcium boride, is obtained which can easily be purified, for instance, by elutriating, by means of ethylene bromide.

The invention is illustrated by the following examples without being restricted thereto:

Example 1

A mixture of 100 kgs. of pulverized boric acid anhydride, 50 kgs. of ground limestone and 60 kgs. of coke powder is heated by electrical resistance heating while occluding air to brightest white heat until the development of carbon monoxide has ceased. After cooling the well crystallized calcium boride obtained from the powdery reaction mass is isolated by simple elutriating.

Instead of the boric acid anhydride used in this example, the stoichiometric quantity of the much cheaper boric acid may be employed without any difficulties. This is rather surprising as boric acid, as a matter of fact, swells up when heated, and, therefore, the rational manufacture of calcium boron compounds in the usual electric furnaces would have become rather difficult or even impossible. Experiments, however, have proved that no swelling up occurs in the dehydrating process when first mixing the boric acid with the quantity of lime and carbon which is required for preparing calcium boride.

Example 2

A mixture of 180 kgs. of boric acid, 50 kgs. of ground limestone and 60 kgs. of coke powder is heated by electrical resistance heating and while occluding air to brighest white heat until no more carbon monoxide is developed. The reaction is effected smoothly and no swelling up occurs. After cooling the well crystallized calcium boride obtained from the powdery reaction mass is isolated by elutriating.

We claim:—

1. The process for the production of calcium boride which comprises heating to a bright white heat a mixture of carbon, a calcium compound which dissociates at the reaction temperature and a boron compound of the group consisting of boric acid anhydride, boric acid and salts thereof.

2. The process for the production of calcium boride which comprises heating to a bright white heat a mixture of about 50–70 parts by weight of carbon, about 40–80 parts by weight of a calcium compound which dissociates at the reaction temperature and about 50–500 parts by weight of a boron compound of the group consisting of boric acid anhydride, boric acid and salts thereof.

3. The process for the production of calcium boride which comprises heating to a bright white heat a mixture of 60 parts by weight of coke powder, 50 parts by weight of calcium carbonate and 100 parts by weight of boric acid anhydride.

4. The process for the production of calcium boride which comprises heating to a bright white heat a mixture of 60 parts by weight of coke powder, 50 parts by weight of calcium carbonate and 180 parts by weight of boric acid.

In testimony whereof, we affix our signatures.

ERICH NOACK.
FRIEDRICH SCHUBERT.